US008307219B2

(12) United States Patent
Varadarajan

(10) Patent No.: US 8,307,219 B2
(45) Date of Patent: Nov. 6, 2012

(54) ENTERPRISE BLACK BOX SYSTEM AND METHOD FOR DATA CENTERS

(75) Inventor: Sridhar Varadarajan, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 485 days.

(21) Appl. No.: 12/501,771

(22) Filed: Jul. 13, 2009

(65) Prior Publication Data
US 2011/0010590 A1      Jan. 13, 2011

(51) Int. Cl.
G06F 9/312       (2006.01)
H04L 29/02       (2006.01)
(52) U.S. Cl. ............................................ 713/193; 726/30
(58) Field of Classification Search .................. None
See application file for complete search history.

(56) References Cited

U.S. PATENT DOCUMENTS

| | | |
|---|---|---|
| 6,370,648 B1 | 4/2002 | Diep |
| 6,405,318 B1 | 6/2002 | Rowland |
| 7,085,936 B1 | 8/2006 | Moran |
| 7,251,829 B1 | 7/2007 | Pagdin et al. |
| 7,305,707 B2 | 12/2007 | Mattsson |
| 7,370,358 B2 | 5/2008 | Ghanea-Hercock |
| 7,412,401 B2 | 8/2008 | Law |
| 7,424,619 B1 | 9/2008 | Fan et al. |
| 7,424,743 B2 | 9/2008 | Hrabik et al. |
| 7,424,746 B1 | 9/2008 | Magdych et al. |
| 7,636,764 B1 * | 12/2009 | Fein et al. .................. 709/212 |
| 2005/0071643 A1 * | 3/2005 | Moghe ....................... 713/182 |
| 2008/0010678 A1 * | 1/2008 | Burdette et al. ............. 726/15 |
| 2008/0109448 A1 * | 5/2008 | Aboel-Nil et al. ............ 707/10 |
| 2009/0025084 A1 * | 1/2009 | Siourthas et al. ............ 726/25 |

OTHER PUBLICATIONS

Vigna et al., "A Stateful Intrusion Detection System for World-Wide Web Servers", 19th Annual Computer Security Applications Conference (ACSAC '03) 2003, 10 Pages.
Kandula et al., "ARGUS—A Distributed Network Intrusion Detection System", Sane 2002—3rd International System Administration and Networking Conference, May 27-31, 2002 MECC, Maastricht, the Netherlands, 17 Pages.
Abraham et al., "D-SCIDS: Distributed Soft Computing Intrusion Detection System", Journal of Network and Computer Applications 30 (2007), pp. 81-98.
Zhou et al. "A Peer-To-Peer Collaborative Intrusion Detection System", Proceedings of the IEEE International Conference on Networks (ICON 2005), Malaysia, Nov. 2005, pp. 118-123.

* cited by examiner

*Primary Examiner* — Venkat Perungavoor
(74) *Attorney, Agent, or Firm* — Venable LLP; Jeffri A. Kaminski; Christopher Ma

(57) ABSTRACT

A system to enable an enterprise to obtain an insight into the functioning and behavior of a data center that hosts the enterprise's IT infrastructure through the alerts raised by the system is provided. These alerts are based on the exhibited abnormal behavior while processing transactions of the data center and are raised by analyzing exhibited behavior with respect to the expected behavior. The system depicts the expected behaviors in the form of model sequences related to the transactions and elaborates an approach for determining these model sequences.

7 Claims, 15 Drawing Sheets

An Illustrative DEBB Network Architecture (Passive Model)

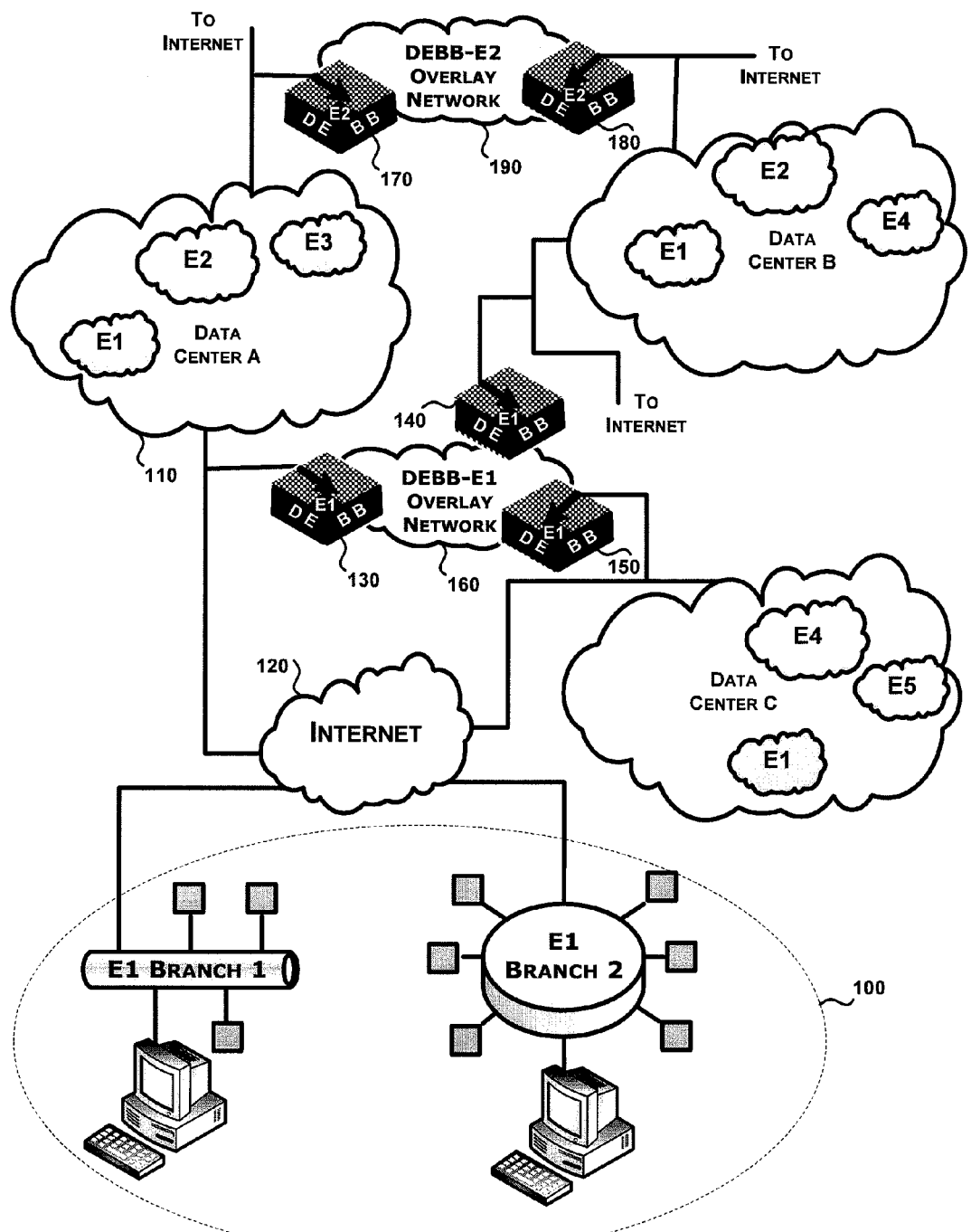
FIG. 1: AN ILLUSTRATIVE DEBB NETWORK ARCHITECTURE (PASSIVE MODEL)

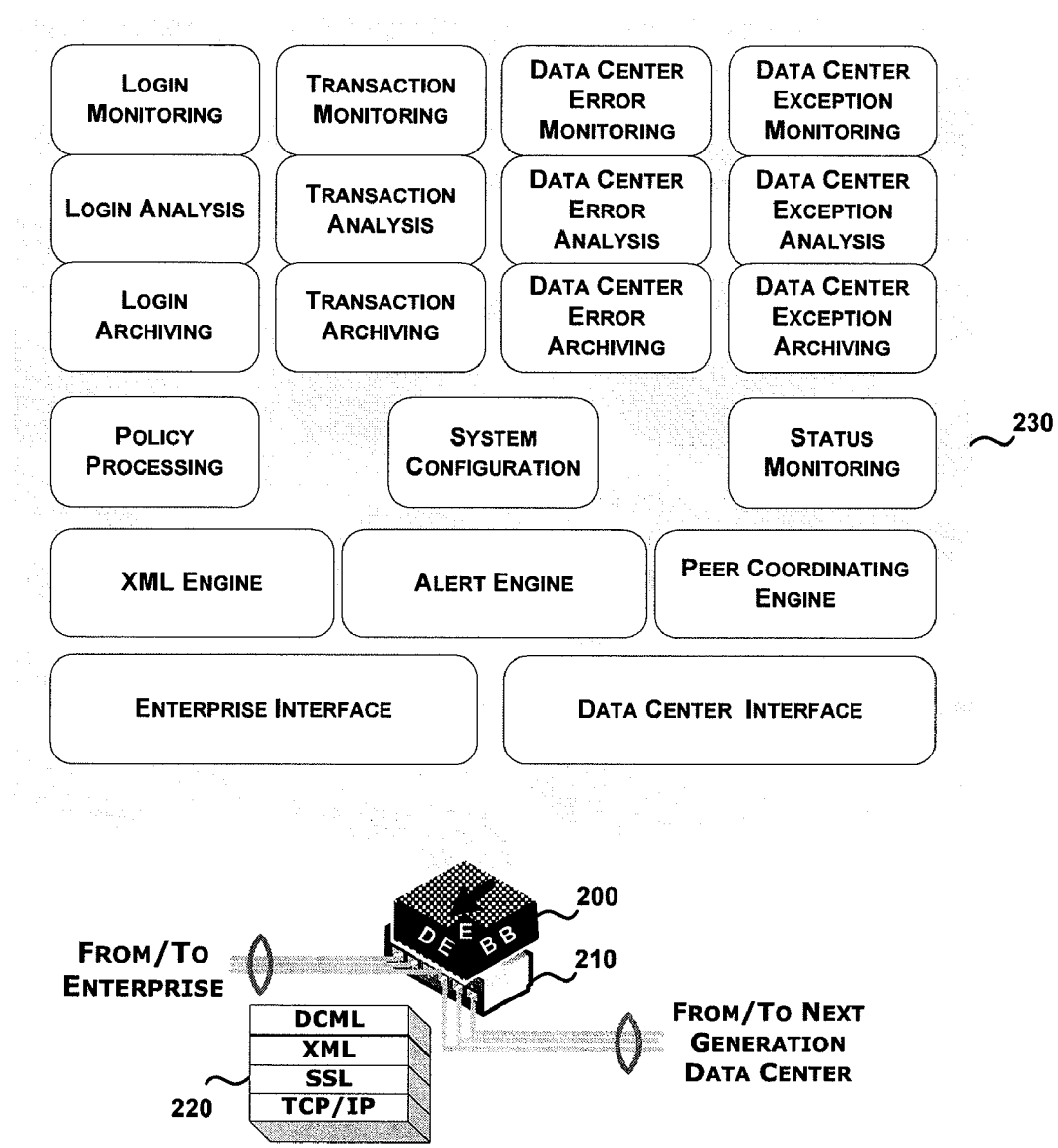
FIG. 2: AN ILLUSTRATIVE SYSTEM ARCHITECTURE OF DEBB SYSTEM (ACTIVE MODEL)

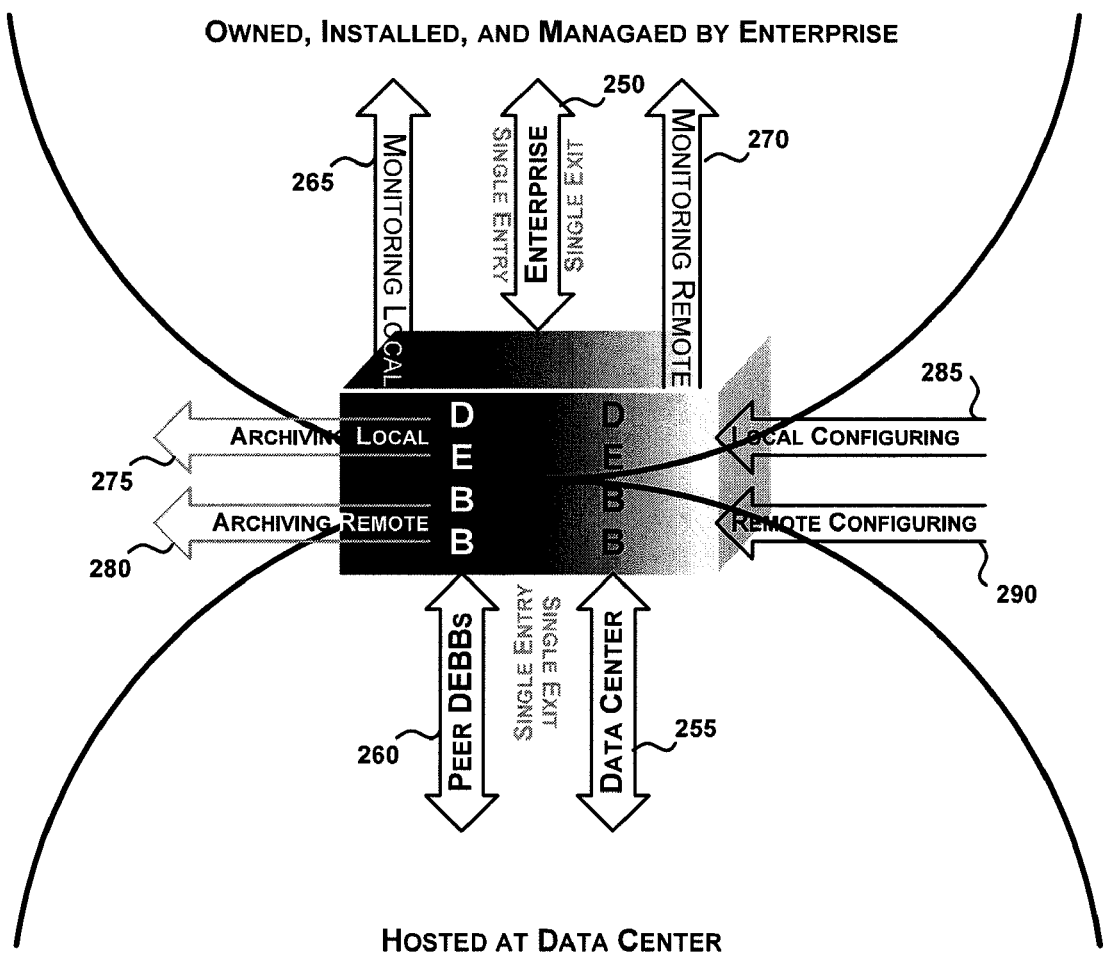
FIG. 2A: AN ILLUSTRATIVE SYSTEM INTERFACES OF DEBB SYSTEM

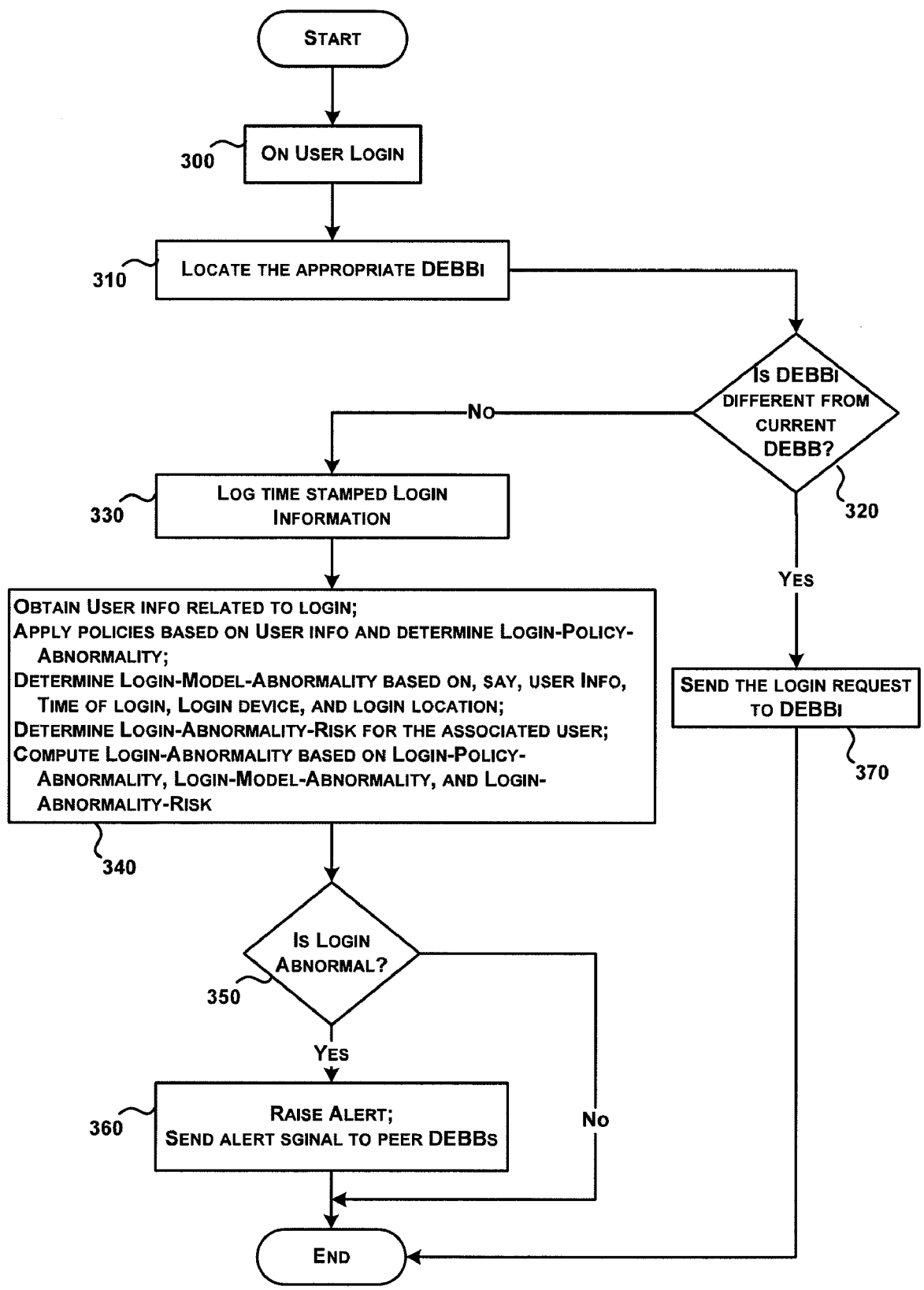
FIG. 3: LOGIN MONITORING AND ANALYSIS

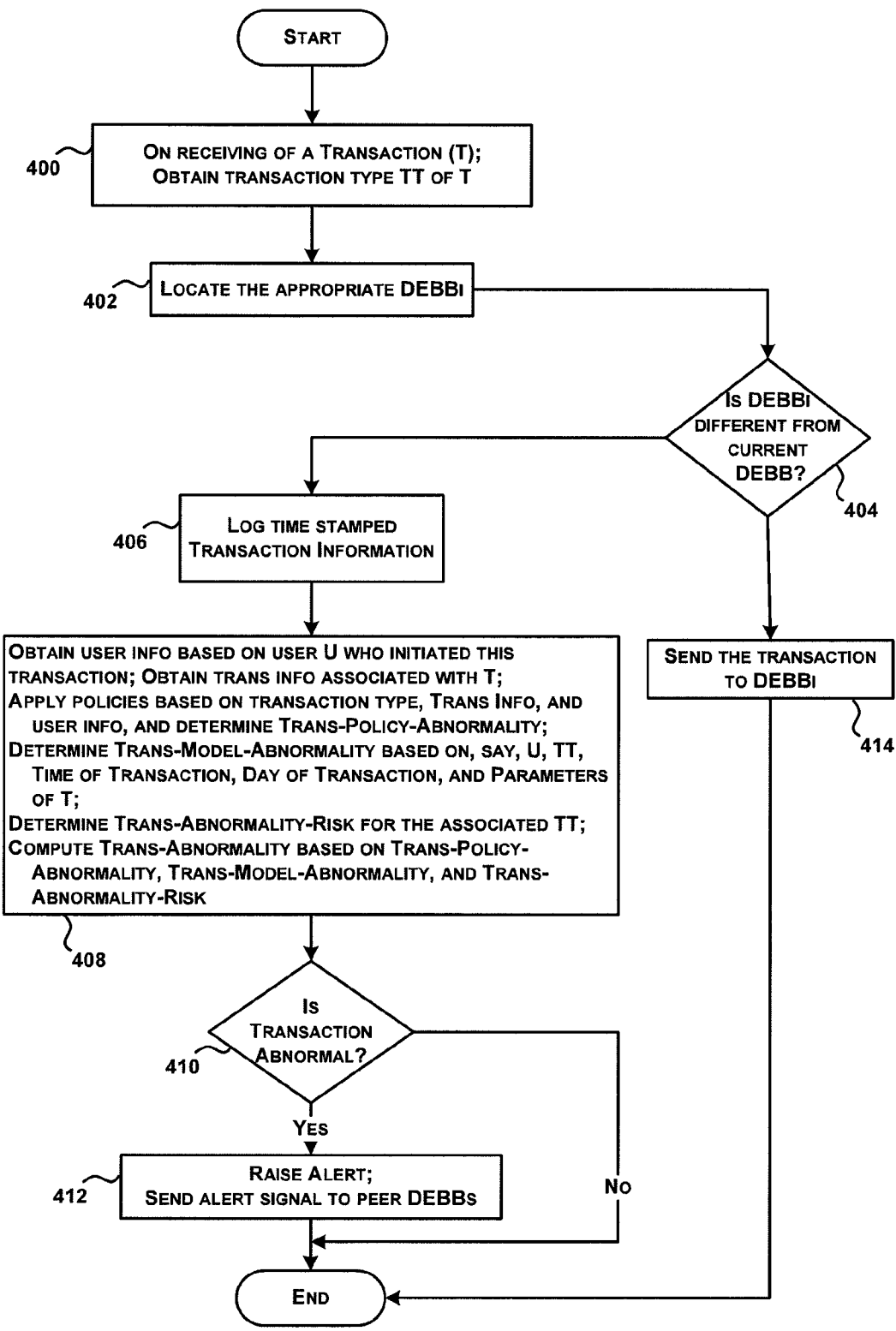
FIG. 4: TRANSACTION MONITORING AND ANALYSIS

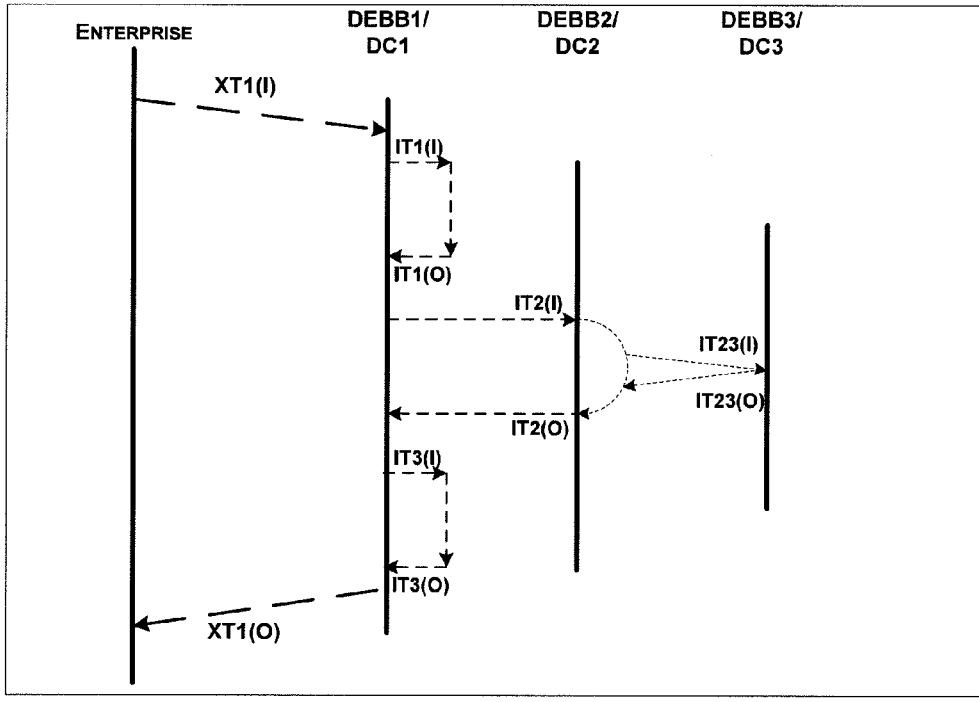
FIG. 4A: KINDS OF TRANSACTIONS – EXTERNAL AND INTERNAL TRANSACTIONS

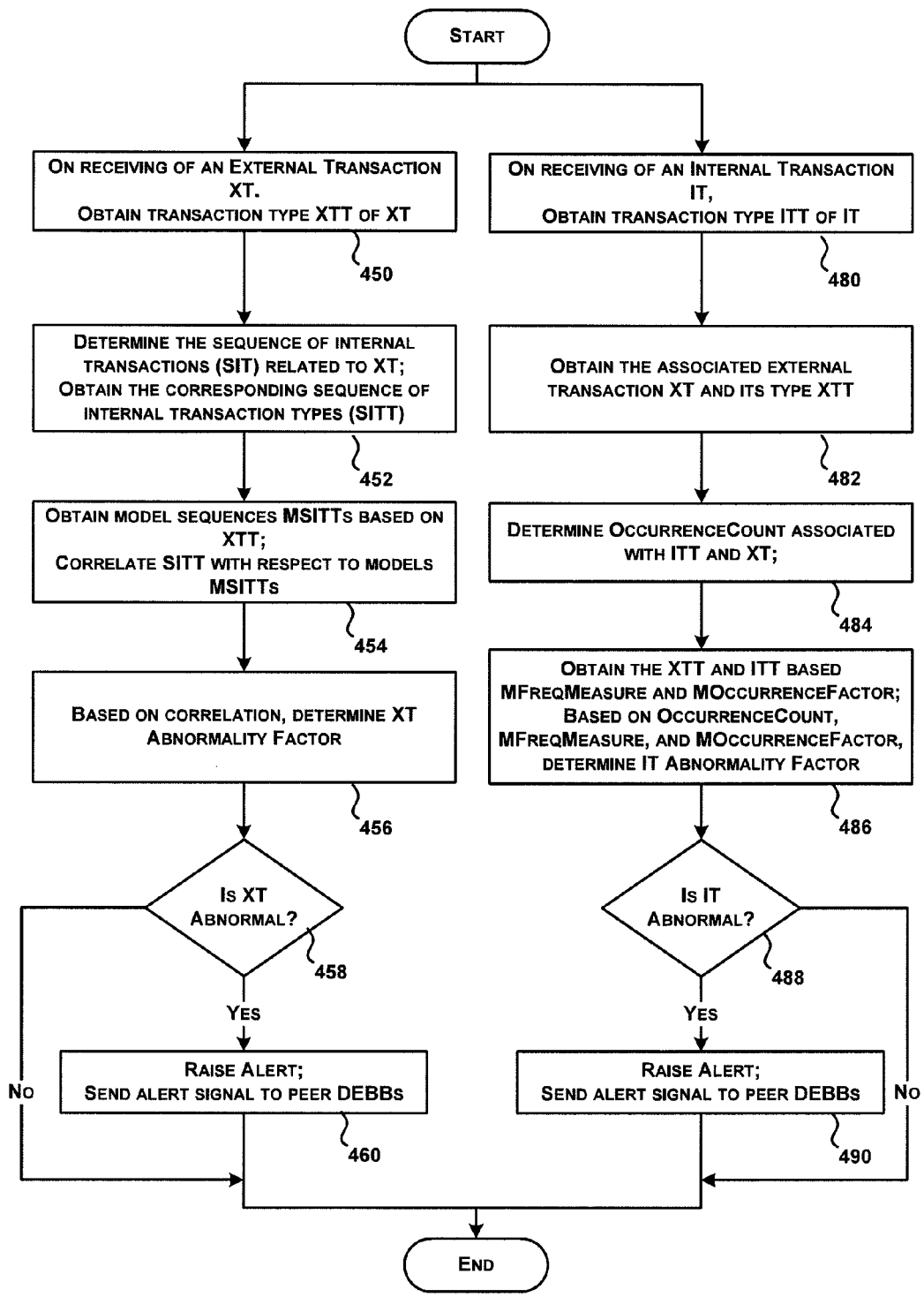
FIG. 4B: ANALYSIS BASED ON TRANSACTION CORRELATION

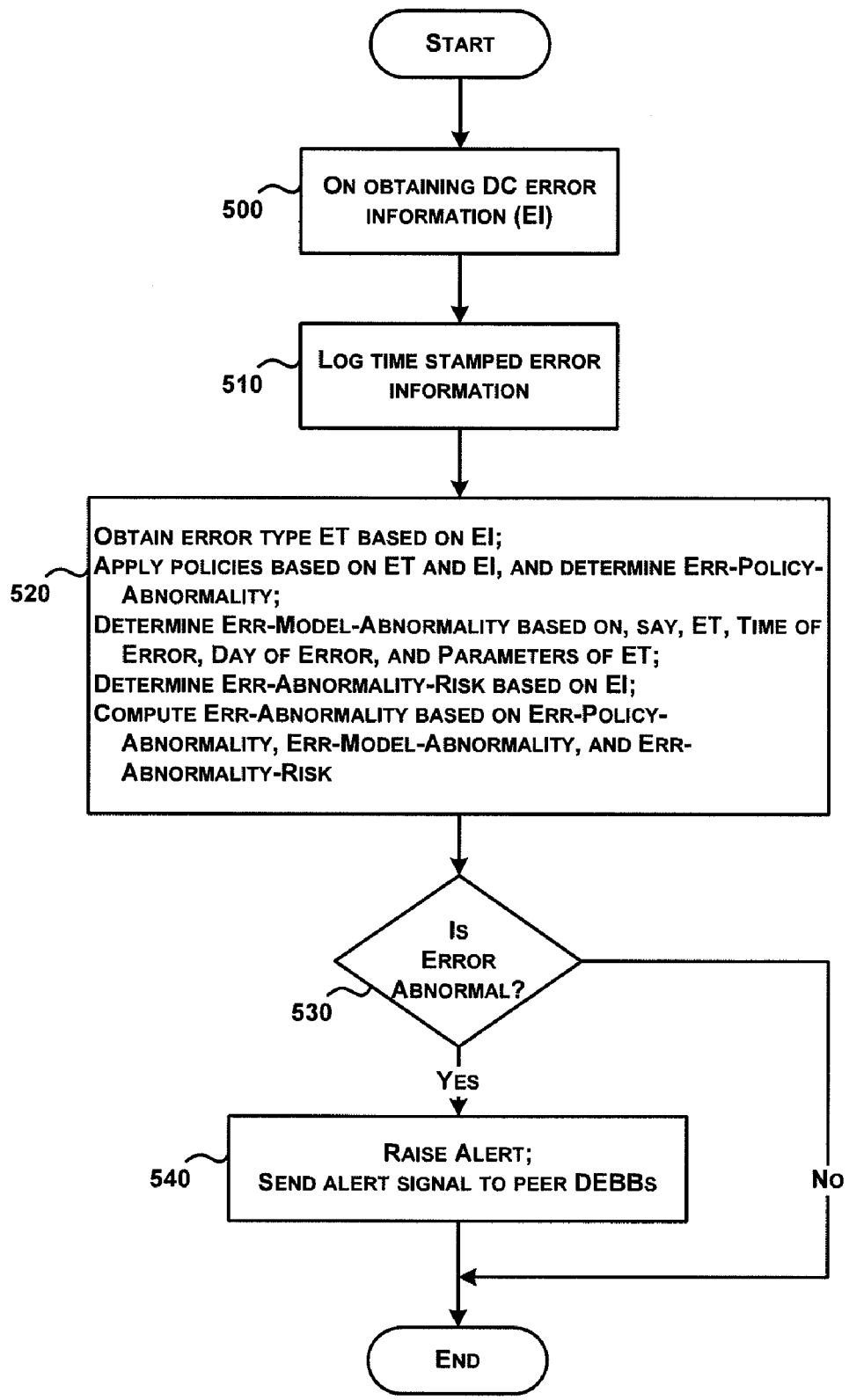
FIG. 5: ERROR MONITORING AND ANALYSIS

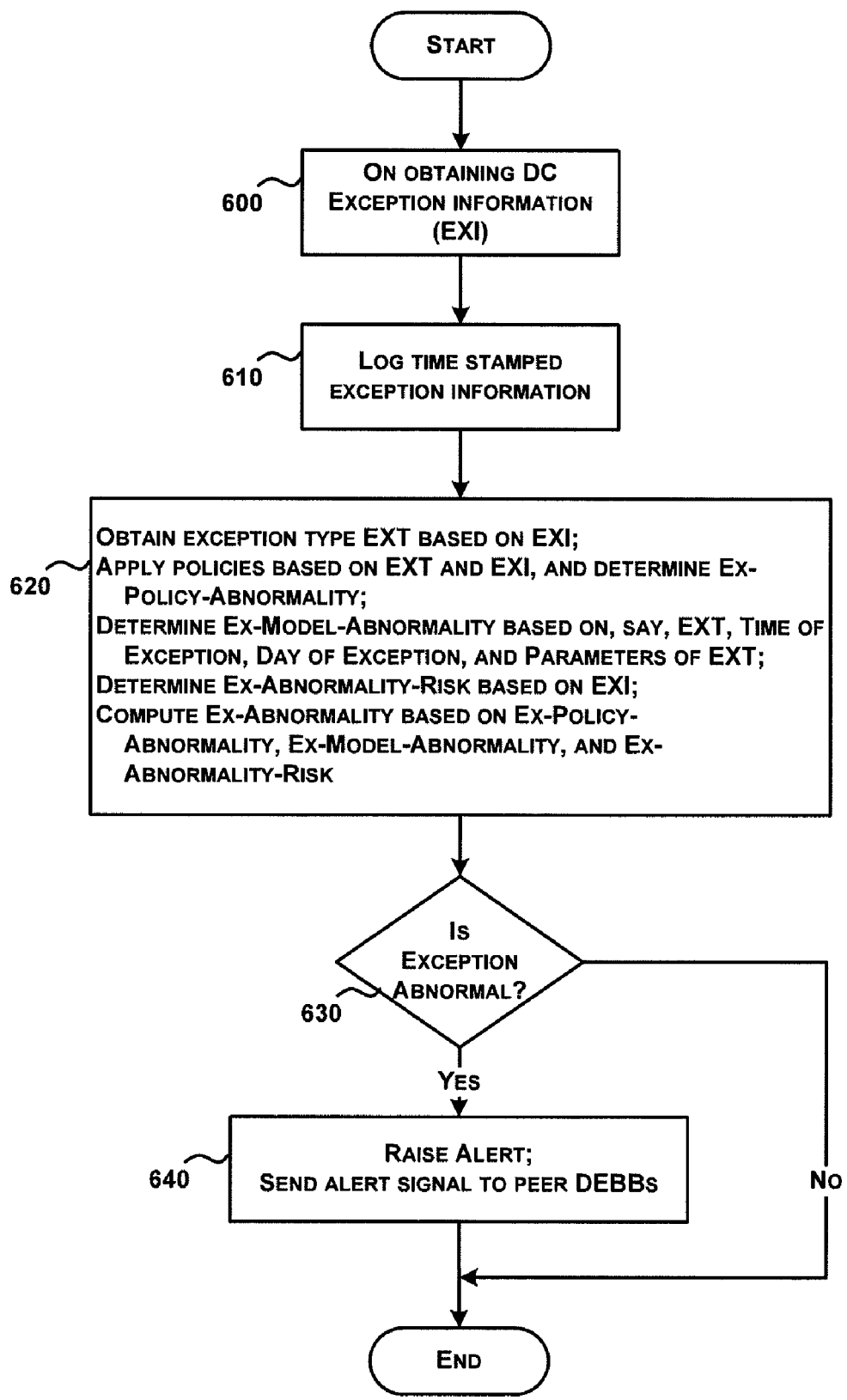
FIG. 6: EXCEPTION MONITORING AND ANALYSIS

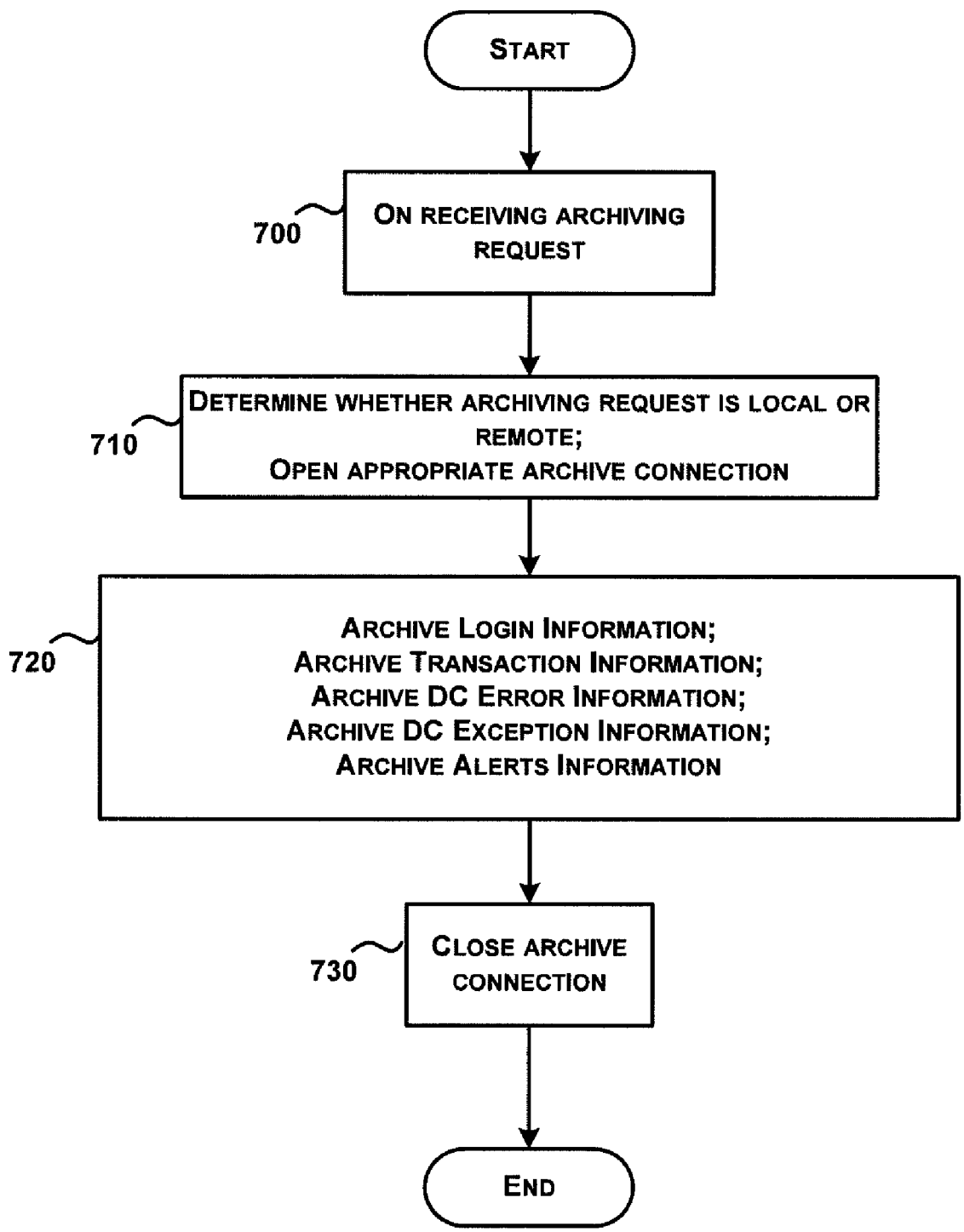
FIG. 7: ARCHIVING

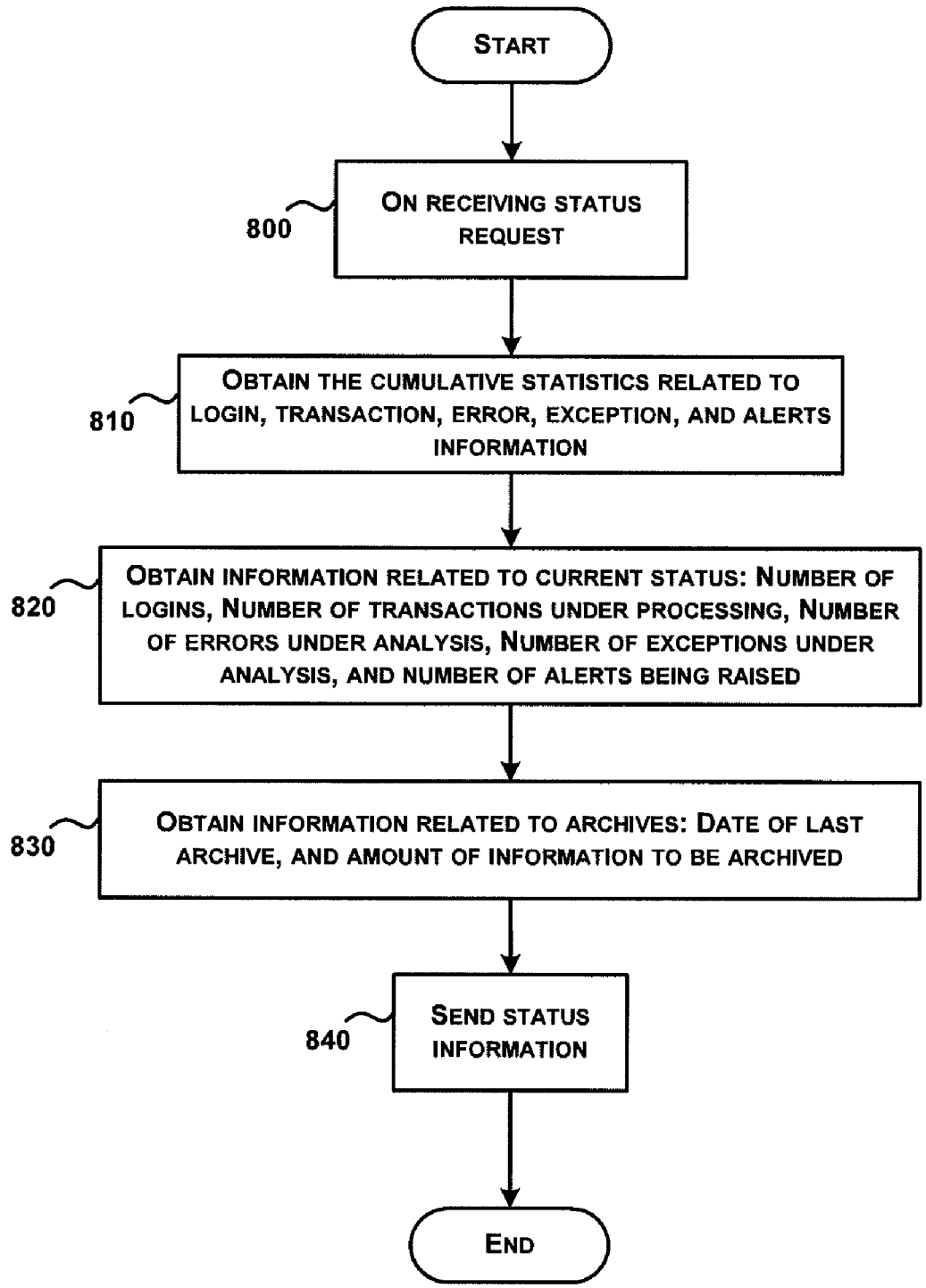
FIG. 8: STATUS MONITORING

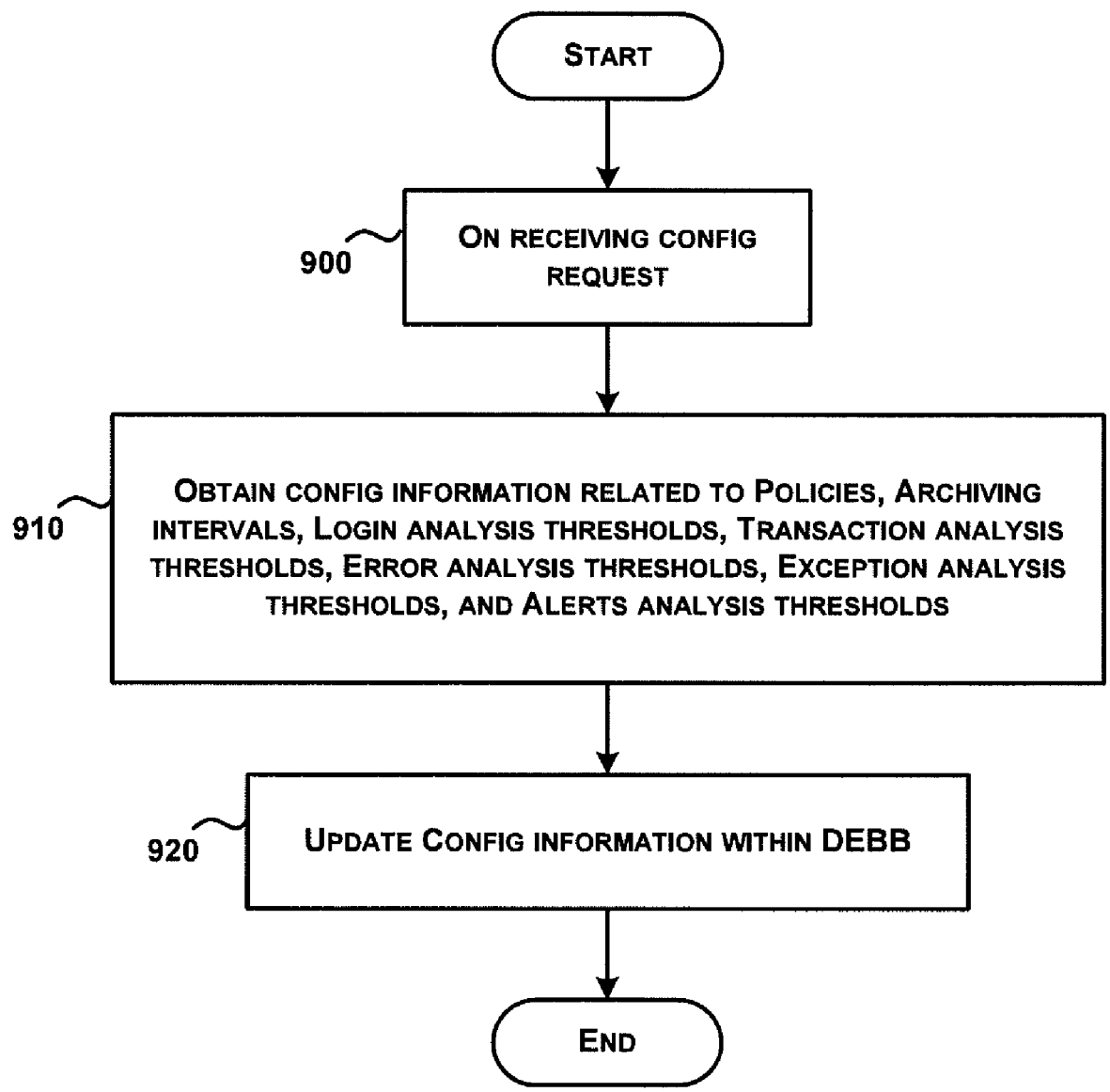
FIG. 9: CONFIG MANAGEMENT

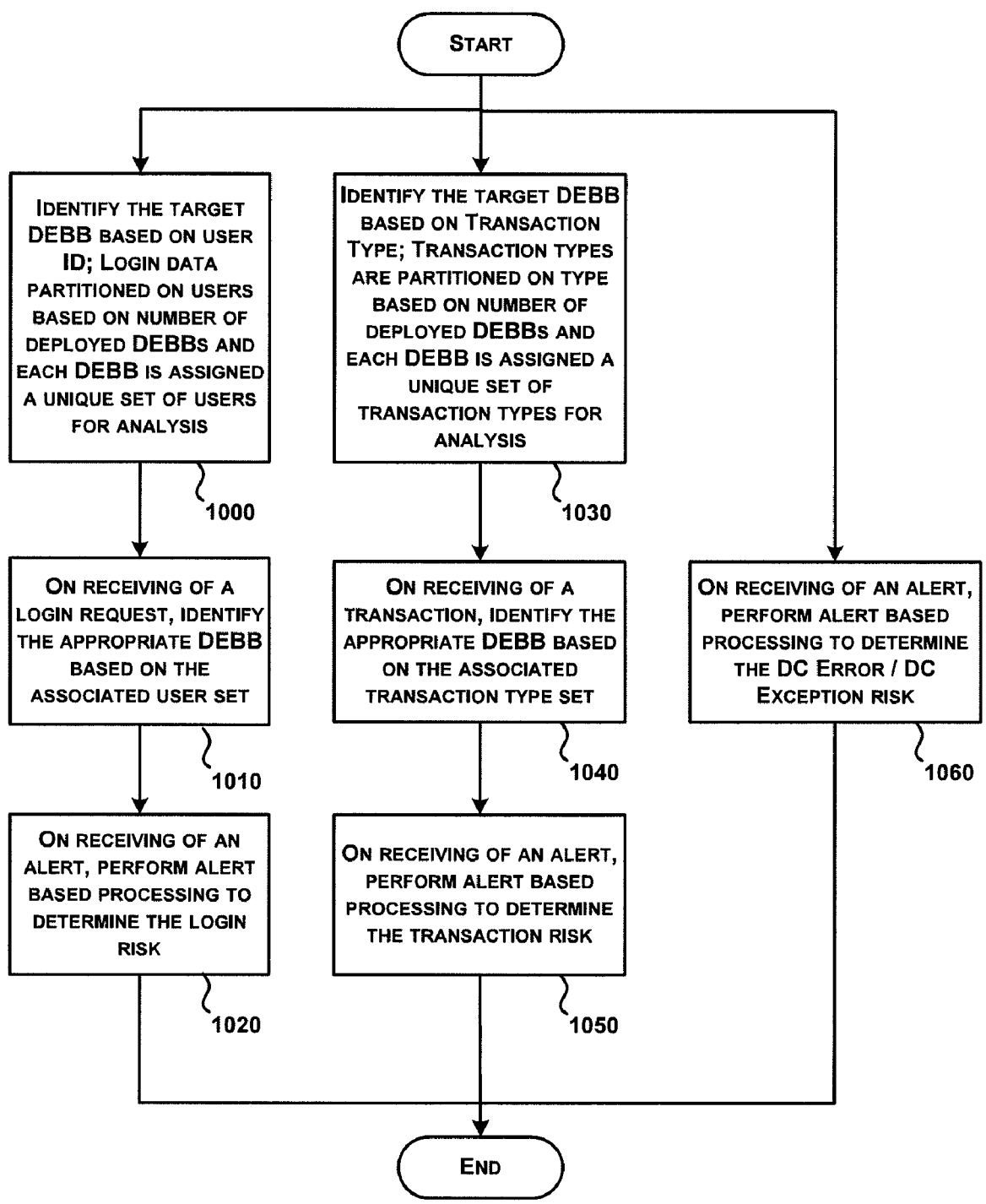
FIG. 10: PEER COORDINATION

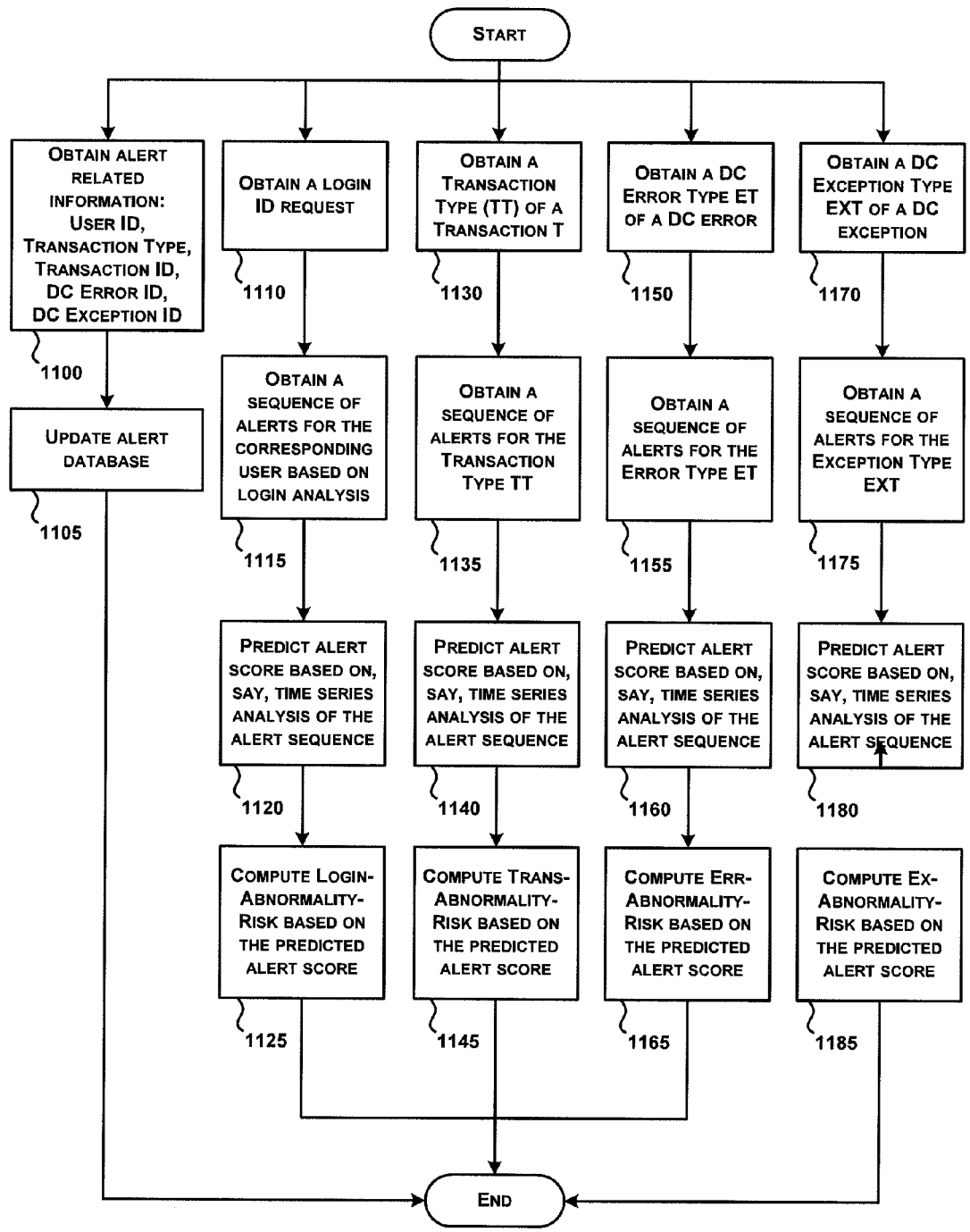
FIG. 11: ALERT BASED RISK ASSESSMENT

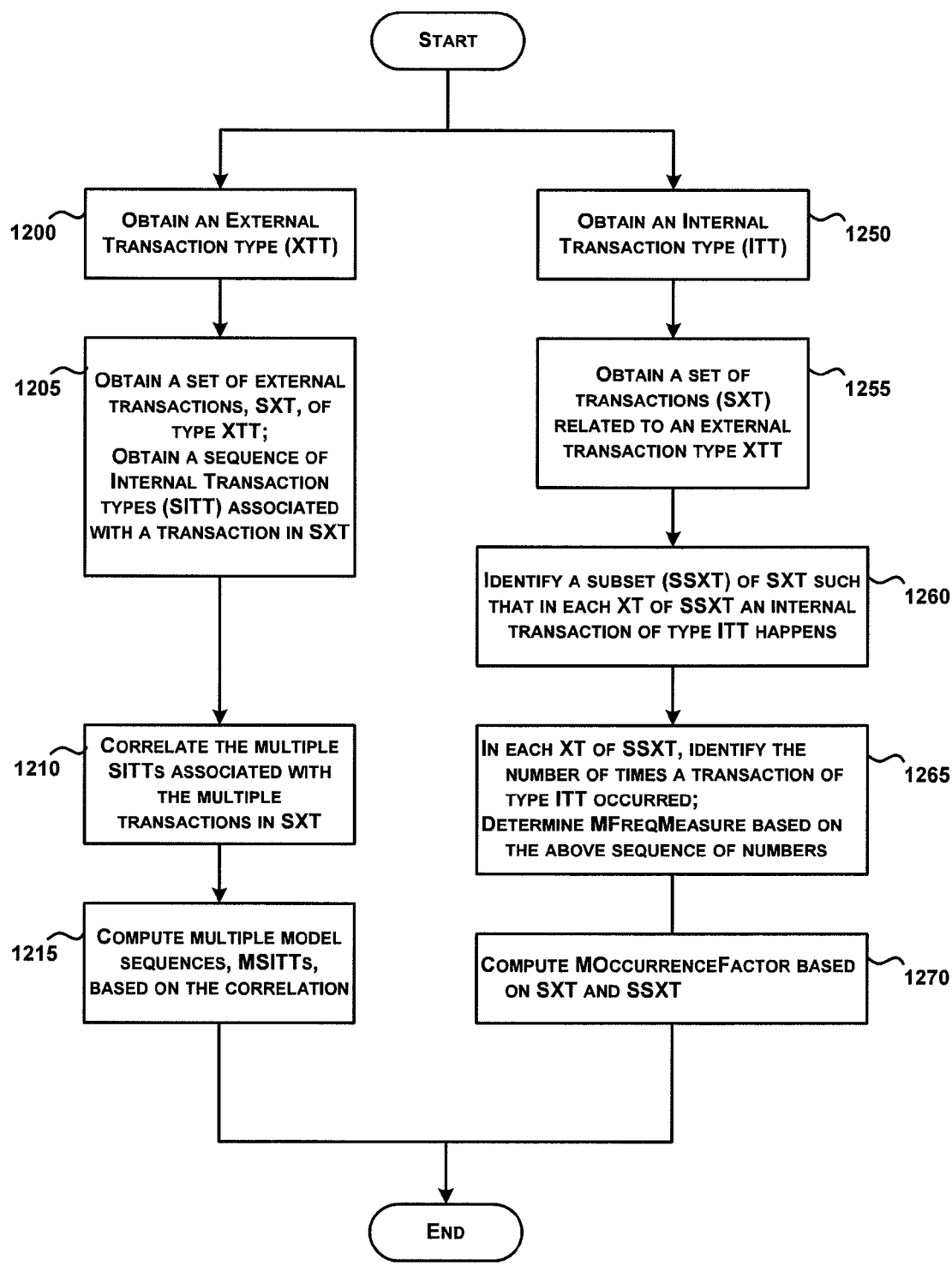
FIG. 12: EXTERNAL AND INTERNAL TRANSACTION MODELS

ENTERPRISE BLACK BOX SYSTEM AND METHOD FOR DATA CENTERS

FIELD OF THE INVENTION

The present invention relates to data centers in general, and more particularly, enhancing the acceptability of data centers. Still more particularly, the present invention is related to a system and method for providing crystal clear visibility of the activities of a data center to an enterprise that uses the data center.

BACKGROUND OF THE INVENTION

Next generation data centers are characterized by the mandate to meet all of the IT needs of the enterprises. This includes the support for infrastructure-less and paper-less enterprises and providing of both data and application services: applications could be offered as hosted services. For various business reasons, an enterprise could distribute its data and applications across multiple data centers; similarly, a data center could host data and application services for multiple enterprises. One of the major concerns of enterprises in such a scenario is about protecting their data/software assets. Enterprises would want a secured environment that assures both performance and protection. Summarizing, distributed data centers are managed by multiple third parties and enterprise data is distributed across multiple data centers.

Data center operations rely on the usage of XML for transactions, information exchange, as well as for management of data center components. Next generation data centers are being organized around a services model. The distributed data centers not only host enterprise data but also host applications. Further, software as a service offered by the next generation data centers enables an economical access to the third party software. Data centers are becoming an irreplaceable part of enterprises. The intellectual assets of an enterprise in the form of applications, workflows, and data are all need to be protected and the enterprise needs to have an awareness of the activities that lead to the usage of applications, and inspection and modification of data assets. All these lead to a need to be able to watch, log, audit, and verify the multifaceted transactions. In order to achieve this, first of all, there needs to be a single entry and single exit to a data center from / to the enterprise. The same entry/exit needs to be used as well during interacting with other data centers in a distributed scenario. Secondly, anything and everything that happens within a data center (again from the enterprise point of view) needs to stored and analyzed. This is the concept that leads to the idea of "black box": a box that is owned by an enterprise and installed within the physical premises of a data center thereby establishing a systematic monitoring of the activities of the data center (again from the enterprise point of view).

DESCRIPTION OF RELATED ART

U.S. Pat. No. 7,424,746 to Magdych; James S. (Chino, Calif.), Rahmanovic; Tarik (Germantown, Md.), McDonald; John R. (Jacksonville, Fla.), Tellier; Brock E. (Stamford, Conn.) for "Intrusion detection and vulnerability assessment system, method and computer program product" (issued on Sep. 9, 2008 and assigned to McAfee, Inc. (Santa Clara, Calif.)) describes a system and associated method/computer program product that includes an intrusion detection tool for determining whether network communications violate at least one of a plurality of policies. Such policies are defined to detect potential attacks in the network communications U.S. Pat. No. 7,424,743 to Hrabik; Michael (Omaha, Neb.), Guilfoyle; Jeffrey J. (Omaha, Neb.), Beaver; Edward "Mac" (Omaha, Neb.) for "Apparatus for verifying the integrity of computer networks and implementation of countermeasures" (issued on Sep. 9, 2008 and assigned to Solutionary, Inc. (Omaha, Neb.)) describes a security system for a computer network that has a plurality of devices connected thereto comprises a security subsystem, a master system and a secure link. The security subsystem is connected to at least some of the devices in the network. The security subsystem is configured to monitor activities of the at least some devices on the network and detect attacks on the at least some devices. The master system monitors the integrity of the security subsystem and registers information pertaining to attacks detected by the security subsystem. The secure link is connected between the security subsystem and the master system. The master system monitors the integrity of the security subsystem and receives the information pertaining to the attacks through the secure link.

U.S. Pat. No. 7,424,619 to Fan; Wei (New York, N.Y.), Stolfo; Salvatore J. (Ridgewood, N.Y.) for "System and methods for anomaly detection and adaptive learning" (issued on Sep. 9, 2008 and assigned to The Trustees of Columbia University in the city of New York (New York, N.Y.)) describes a method of generating an anomaly detection model for classifying activities of a computer system, using a training set of data corresponding to activity on the computer system, the training set comprising a plurality of instances of data having features, and wherein each feature in said plurality of features has a plurality of values.

U.S. Pat. No. 7,412,401 to Law; Robert A. (Ridgefield, Conn.) for "Messaging system having recipient profiling" (issued on Aug. 12, 2008 and assigned to Pitney Bowes Inc. (Stamford, Conn.)) describes an information system that includes a plurality of messaging systems, a data center and a control system. The plurality of messaging systems process respective messages intended for recipients. The data center is in operative communication with the plurality of messaging systems and stores transaction data associated with each respective message. The control system is in operative communication with the data center. The control system identifies selected transaction data from among the transaction data corresponding to a defined recipient and uses the selected transaction data to generate a recipient profile of messages intended for the defined recipient that have been processed by the plurality of messaging systems.

U.S. Pat. No. 7,370,358 to Ghanea-Hercock; Robert A (Ipswich, GB) for "Agent-based intrusion detection system" (issued on May 6, 2008 and assigned to British Telecommunications public limited company (London, GB)) describes a computer security system that uses a plurality of co-operating software agents to protect a network against attack. Individual agents at each node the network co-operatively act to detect attacks and to share attack signatures and solutions via a message exchange mechanism. A global internal measurement of the overall health of the group of agents may be used as an indicator of a possible attack.

U.S. Pat. No. 7,305,707 to Mattsson; Ulf (Cos Cob, Conn.) for "Method for intrusion detection in a database system" (issued on Dec. 4, 2007 and assigned to Protegrity Corporation (Grand Cayman, Key.)) describes a method for detecting intrusion in a database, managed by an access control system, that includes defining at least one intrusion detection profile and associating each user with one of said profiles. Each profile includes at least one item access rate. Further, the method determines whether a result of a query exceeds any one of the item access rates defined in the profile associated with the user. In such a case, the access control system is notified to alter the user authorization, thereby making the received request an unauthorized request, before the result is transmitted to the user.

U.S. Pat. No. 7,251,829 to Pagdin; William D. (Wantage, N.J.), Harding; Jerry (Alexandria, Va.) for "Data analysis and security system" (issued on Jul. 31, 2007 and assigned to Type80 Security Software, Inc. (Anderson, Ind.)) describes a process that collects and analyzes data from computer mainframe system events and/or messages as they occur, utilizing a System Management Facility (SMF) interface, a SubSystem Interface (SSI), an Event Notification Facility (ENF) interface, and generates alert message(s) when installation-developed rules so indicate, to provide real-time mainframe event and message monitoring, with notification to multiple targets based on either of two factors: a) configuration parameters defined by auditors and security administrators, and b) statistical analysis and correlation of historical event data (profiling).

U.S. Pat. No. 7,085,936 to Moran; Douglas B. (Palo Alto, Calif.) for "System and method for using login correlations to detect intrusions" (issued on Aug. 1, 2006 and assigned to Symantec Corporation (Cupertino, Calif.)) describes a system and method for detecting intrusions in a host system on a network. The intrusion detection system comprises an analysis engine configured to use continuations and apply forward- and backward-chaining using rules. An attacker will typically try to wipe out the records of their login session and wants to hide the information about and related to the login session. A signature checking mechanism computes the signature of a file and compares it to previously computed signatures. The intrusion detection system further includes a mechanism for checking timestamps to identify and analyze forward and backward time steps in a log file.

U.S. Pat. No. 6,405,318 to Rowland; Craig H. (Austin, Tex.) for "Intrusion detection system" (issued on Jun. 11, 2002 and assigned to Psionic Software, Inc. (Austin, Tex.)) describes a computer-implemented intrusion detection system and method that monitors a computer system in real-time for activity indicative of attempted or actual access by unauthorized persons or computers. The system detects unauthorized users attempting to enter into a computer system by comparing user behavior to a user profile, detects events that indicate an unauthorized entry into the computer system, notifies a control function about the unauthorized users and events that indicate unauthorized entry into the computer system and has a control function that automatically takes action in response to the event.

U.S. Pat. No. 6,370,648 to Diep; Thanh A. (Los Altos, Calif.) for "Computer network intrusion detection" (issued on Apr. 9, 2002 and assigned to Visa International Service Association (Foster City, Calif.)) describes an approach for detecting harmful or illegal intrusions into a computer network or into restricted portions of a computer network using statistical analysis to match user commands and program names with a template sequence.

"A Stateful Intrusion Detection System for World-Wide Web Servers" by Vigna, G., Robertson, W., Kher, V., and Kemmerer, R. (appeared in the 19th Annual Computer Security Applications Conference (ACSAC '03), 2003) describes an intrusion detection system that analyzes web requests looking for evidence of malicious behavior. The paper provides a sophisticated language to describe multistep attacks in terms of states and transitions. In addition, the modular nature of the system supports the integrated analysis of network traffic sent to the server host, operating system-level audit data produced by the server host, and the access logs produced by the web server. By correlating different streams of events, it is possible to achieve more effective detection of web-based attacks.

"Argus—A Distributed Network Intrusion Detection System" by Kandula, S., Singh, S., and Sanghi, D. (appeared in SANE 2002—3rd International System Administration and Networking Conference, May 27-31, 2002 MECC, Maastricht, The Netherlands) describes a network intrusion detection system based on a set of loosely coupled analyzing agents each of which is either knowledge-based or anomaly-based.

"D-SCIDS: Distributed soft computing intrusion detection system" by Abraham, A., Jain, R., Thomas, J., and Han, S. (appeared in Journal of Network and Computer Applications 30 (2007) pp 81-98) describes an evaluation of three fuzzy rule based classifiers to detect intrusions in a network. Further, the distributed soft computing-based intrusion detection system is modeled as a combination of different classifiers to model lightweight and more accurate (heavy weight) intrusion detection system.

"A Peer-to-Peer Collaborative Intrusion Detection System" by Zhou, C., Karunasekera, S., and Leckie, C. (appeared in Proceedings of the IEEE International Conference on Networks (ICON 2005), Malaysia, November 2005, pp. 118-123) proposes a peer-to-peer approach for collaborative intrusion detection to address the various challenges of collaborative detection such as scalability and avoidance of central point of failure.

The known systems do not the address the various issues involved in monitoring of distributed systems involving distributed ownership. Specifically, in the context of data centers, the infrastructure is owned by one party while application and data assets are owned by a second party. The second party may or may not have control over the other party owned infrastructure: this leads to the issues of awareness, assuredness, and auditability. This is further complicated in the next generation scenario wherein the assets of an enterprise are distributed across multiple data centers each owned by a different party. How can the enterprise have a comprehensive awareness, assuredness, and auditability of their assets and use/misuse of the same? The known systems do not comprehensively address this important issue of the enterprises. Enterprises in particular would want to know what happened (transactions) when (timestamps of the transactions) and where (server/database details).

A way to meet this expectation of the enterprises is to allow for a black box to be installed within a data center premises. Note that the notion of "black box" as referred here is based on the most well known "black box" concept used in the aviation industry. In aviation industry, the term "black box" is associated with a device that records all communications in the cockpit of an aircraft in flight. Specifically, this includes flight data recordings and cockpit voice recordings. The present invention positions a black box, called DEBB (enterprise black box for data centers), that is owned, installed, configured, controlled, and managed by an enterprise and installed as part of the data center infrastructure. As its aviation counterpart, DEBB brings in visibility and transparency to an enterprise with regard to a data center: again like its aviation counterpart, DEBB records all communications in the data center during transactions.

SUMMARY OF THE INVENTION

The primary objective of the invention is to enhance awareness, assuredness, and auditability of activities of a data center to an enterprise that is availing the services of the data center.

One aspect of the invention is to perform login monitoring, analysis, and archiving.

Another aspect of the invention is to perform external transaction monitoring, analysis, and archiving.

Yet another aspect of the invention is to perform internal transaction monitoring, analysis, and archiving.

Another aspect of the invention is to perform analysis based on the correlation of an internal transaction.

Yet another aspect of the invention is to perform analysis based on the correlation of an external transaction.

Another aspect of the invention is to perform monitoring, analysis, and archiving of errors generated within a data center.

Yet another aspect of the invention is to perform monitoring, analysis, and archiving of exceptions generated within a data center.

Another aspect of the invention is to perform enterprise-specific policy based analysis.

Yet another aspect of the invention is to allow for status monitoring and configuration management a DEBB.

Another aspect of the invention is to allow for peer coordination among a plurality of DEBBs.

Yet another aspect of the invention is to perform alert based risk assessment of an activity related to a data center.

BRIEF DESCRIPTION OF THE DRAWINGS

FIG. 1 depicts an Illustrative DEBB Network Architecture (Passive Model).

FIG. 2 depicts an Illustrative System Architecture of DEBB System (Active Model).

FIG. 2a depicts an Illustrative System Interfaces of DEBB System.

FIG. 3 provides a brief description of Login Monitoring and Analysis.

FIG. 4 provides a brief description of Transaction Monitoring and Analysis.

FIG. 4a provides a brief description on the kinds of transactions.

FIG. 4b provides a brief description of the analysis based on Transaction Correlation.

FIG. 5 provides a brief description of Error Monitoring and Analysis.

FIG. 6 provides a brief description Exception Monitoring and Analysis.

FIG. 7 provides a brief description of the Archiving process.

FIG. 8 provides a brief description of Status Monitoring.

FIG. 9 provides a brief description of Configuration Management.

FIG. 10 provides a brief description of Peer Coordination among a plurality of DEBBs.

FIG. 11 provides a brief description of the Alert based Risk Assessment.

FIG. 12 provides a brief description of External and Internal Transaction Models.

DETAILED DESCRIPTION OF THE PREFERRED EMBODIMENTS

Data centers are evolving to provide enhanced services to enterprises: the main objective of the next generation data centers is to support all or at least most of an enterprise's IT services. While data centers are evolving, the enterprises need visibility and transparency into the activities of data centers in order for them invest on the enhanced offerings. The infrastructure part of a data center is owned by a third party and, in the distributed scenario, a particular data center could serve the needs of multiple enterprises. Further, the application and data assets of an enterprise could be typically distributed across multiple data centers with each data center being in a different geographic locality owned by a distinct third party. Under this kind of situations, irrespective of the geography and infrastructure ownership, there is a need for an enterprise to have the same awareness, assuredness, and auditability across the multitude of data centers. This is achieved by installing the enterprise owned "black box" called DEBB in each of these data centers. This black box is installed, configured, managed, controlled, and archived by the owned enterprise. This enterprise "guard" provides all the necessary information to the owned enterprise to enhance awareness, assuredness, and auditability.

FIG. 1 depicts an Illustrative DEBB Network Architecture (Passive Model). A typical enterprise E1 (100) is connected to multiple data centers: Data Center A (110), Data Center B, and Data Center C via the Internet (120). In order for enterprises to have comprehensive awareness, assuredness, and auditability, enterprise owned black boxes, DEBBs, are installed as part of the data center infrastructure. There are two models involving the connectivity of a DEBB to a data center: In passive model, DEBBs are out-of-line and tap onto the communication channel interconnecting data centers and enterprises; On the other hand, in active model, DEBBs are in-line and data reaches a data center only through a DEBB. Each data center has a DEBB for each of the enterprises that is hosted on that data center. Observe this in FIG. 1 wherein the three DEBBs (130, 140, and 150) are enterprise E1 specific while the two DEBBs (170 and 180) are enterprise E2 specific. The DEBBs that are part of an enterprise are interconnected via an overlay network. Observe that the overlay network (160) interconnects E1 DEBBs and the overlay network (190) interconnects E2 DEBBs. It is to be observed that, irrespective of the active model or passive model, the black box operations are not in line with the transaction processing within a data center: that is, a DEBB doesn't control data center operations and transaction processing; transaction processing happens independent of the monitoring and analysis within the black box.

FIG. 2 depicts an Illustrative System Architecture of DEBB System (Active Model). As depicted, in the active model, DEBB (200) is in-line with the communication channel interconnecting an enterprise with a data center, and receives, stores, and forwards the requests in both directions (from enterprise to data center, and from data center to enterprise) (210). A typical request is encoded in a specific XML such as DCML (data center markup language), and is secured using SSL and transported through the network using TCP/IP protocol (220). The overall system architecture (230) comprises of: (a) login monitoring, analysis, and archiving module; (b) Transaction monitoring, analysis, and archiving module for handling both external and internal transactions, wherein an external transaction is associated with activities originating from an enterprise while an internal transaction is due to the activities (mostly system activities) within a data center; (c) Data center error monitoring, analysis, and archiving module; (d) Data center exception monitoring, analysis, and archiving module; (e) Policy engine to help enforce enterprise specific policies; (f) Configuration management module to help configure the black box; (g) Status monitoring module to help in local and remote monitoring of the black box; (h) XML engine to help process XML and DCML encoded data; (i) Alert engine to help generate, process, and distribute alerts; and (j) Peer coordination engine to help interact with other DEBBs that are on the same overlay network.

FIG. 2a depicts an Illustrative System Interfaces of DEBB System. Observe that a DEBB is owned, installed, and managed by an enterprise and is hosted at a data center. The major interfaces are: (a) Enterprise interface (250) for supporting enterprise transactions; (b) Data center interface (255) for supporting communicating with a data center; (c) peer DEBBs interface (260) for supporting interacting with the DEBBs that are on an overlay network; (d) Local monitoring interface (265) for supporting the monitoring of the DEBB locally; (e) Remote monitoring interface (270) for supporting the monitoring of the DEBB remotely; (f) Local archiving interface (275) for supporting archiving of the DEBB data locally; (g) Remote archiving interface (280) for supporting archiving of the DEBB data remotely; (h) Local configuring interface (285) for supporting the configuring of the DEBB locally; and (i) Remote configuring interface (290) for supporting the configuring of the DEBB remotely.

FIG. 3 provides a brief description of Login Monitoring and Analysis. A typical next generation data center involves multiple distributed data centers and hence, there are multiple distributed DEBBs as well. These DEBBs are interconnected via a DEBB overlay network and these black boxes are structured in a way to ensure an efficient distributed processing. In one kind of structuring, the users are partitioned and distributed across the DEBBs: each DEBB is assigned a set of users, and as a consequence, each DEBB processes the logins of the users assigned to it.

On login by a user (300), locate the appropriate DEBBi whose assigned set of users contains U (310). If DEBBi is the same as current DEBB (320), log the time stamped login information (330). Obtain the user info related to the login and apply policies based on the user info and determine Login-Policy-Abnormality (340). Note that as DEBBs are enterprise specific, the policies enforced by a DEBB are enterprise specific as well. Determine Login-Model-Abnormality based on user info and a set of models. An illustrative model is defined based on user info, time of login, login device, and login location associated with a set of login requests. Determine Login-Abnormality-Risk for the user based on prior login alerts associated with the user. Finally, compute Login-Abnormality based on above mentioned three abnormalities, namely, Login-Policy-Abnormality, Login-Model-Abnormality, and Login-Abnormality-Risk. Determine whether the login is abnormal based on the computed Login-Abnormality (350). If so, raise an abnormal login alert and send this alert signal to other DEBBs (360). If DEBBi is different from the current DEBB (320), then send the login request to DEBBi (370).

FIG. 4 provides a brief description of Transaction Monitoring and Analysis. A typical next generation data center involves multiple distributed data centers and hence, there are multiple distributed DEBBs as well. These DEBBs are interconnected via a DEBB overlay network and these black boxes are structured in a way to ensure an efficient distributed processing. In one kind of structuring, the transaction types are partitioned and distributed across the DEBBs: each DEBB is assigned a set of transaction types, and as a consequence, each DEBB processes the transactions based on the transaction types assigned to it.

On receiving of a transaction T (400), obtain the transaction type TT associated with T. Locate the appropriate DEBBi whose assigned set of transaction types contains TT (402). If DEBBi is the same as current DEBB (404), log the time stamped transaction information (406). Obtain the User info based on user U who initiated the transaction T and the Trans info associated with the transaction T. Apply policies based on the transaction type TT, Trans info, and User info, and determine Trans-Policy-Abnormality (408). Note that as DEBBs are enterprise specific, the policies enforced by a DEBB are enterprise specific as well. Determine Trans-Model-Abnormality based on user info, trans info, and a set of models. An illustrative model is defined based on U, TT, User info, Trans info, time of transaction, day of transaction, and parameters of transaction associated with a set of transactions. Determine Trans-Abnormality-Risk for the associated TT based on the associated transaction related prior alerts. Finally, compute Trans-Abnormality based on above mentioned three abnormalities, namely, Trans-Policy-Abnormality, Trans-Model-Abnormality, and Trans-Abnormality-Risk. Determine whether the trans is abnormal based on the computed Trans-Abnormality (410). If so, raise an abnormal trans alert and send this alert signal to other DEBBs (412). If DEBBi is different from the current DEBB (404), then send the trans info to DEBBi (414).

FIG. 4a provides a brief description on the kinds of transactions. Two distinct kinds of transactions are identified: External transactions and Internal transactions. An external transaction (XT) originates based on an enterprise activity while an internal transaction (IT) is due to the activities within a data center. An external transaction XT has zero or more internal transactions, ITs, with each of the internal transactions being invoked one or more times. The abstraction is in terms of transaction types: external transaction type (XTT) and internal transaction type (ITT). Given a set of external transactions, SXT, with each being of type XTT, the following is obtained (430):

$$XT1=\{IT11, IT12, \ldots, IT1m\} => XTT=\{ITT1, ITT2, \ldots\}$$

$$XT2=\{IT21, IT22, \ldots, IT2m\} => XTT=\{ITT1, ITT3, \ldots\}$$

$$XTn=\{ITn1, ITn2, \ldots, ITnm\} => XTT=\{IT2, ITT3, \ldots\}$$

This abstraction forms the basis for the identification of one or more models to describe a sequence of international transactions associated with an external transaction. Based on above abstraction, the multiple transactions of type XTT can be comprehensively analyzed yielding multiple abstract ITT sequences that collectively represent the transactions.

Similarly, consider an internal transaction, IT. IT can happen as part of one or more external transactions, and in each case, it can occur one or more times.

Consider an Internal Transaction Type, ITT (432):
An internal transaction IT of type ITT can happen as part of one or more external transaction types;
Abstraction of ITT involves the analysis of multiple transactions of type XTT to determine how often ITT occurs as part of XTT;
Two abstractions of ITT with respect to XTT:
FrequencyMeasure: A count measure of the frequency of occurrence of an instance of ITT with respect to the external transactions of type XTT;
OccurrenceFactor: A measure of the possibility of an internal transaction of type ITT occurring as part of an external transaction of type XTT;

An illustrative sequence diagram (434) depicts pictorially the involved external and internal transactions. Note that XT1 (I) indicates the request external transaction XT1 and XT1(0) indicates the corresponding response. Further, IT1 can be an internal database transaction while IT2 and IT23 depict the internal transactions involving peer DEBBs.

FIG. 4b provides a brief description of the transaction analysis based on correlation. The objective is to determine whether a particular external transaction or an internal transaction is abnormal. This is achieved using external transaction type and internal transaction type models. On receiving of an external transaction XT, obtain the transaction type XTT (450). Determine the sequence of internal transactions (SIT) related to XT (452). Obtain the corresponding sequence of internal transaction types (SITT). Obtain model sequences MSITTs based on XTT and correlate SITT with respect to models MSITTs (454). Based on correlation, determine XT abnormality factor (456). If XT is abnormal (458) based on XT abnormality factor, raise an abnormal trans alert and send alert signal to peer DEBBs (460).

On receiving of an internal transaction IT, obtain the transaction type ITT of IT (480). Obtain the associated external transaction XT and its corresponding type XTT (482).

Determine the OccurrenceCount associated with ITT and XT (484). Obtain the XTT and ITT based MFreqMeasure and MOccurrenceFactor, and determine IT abnormality factor (486). For example, if OccurrenceFactor is close to MFreqM [Av] (average value based on frequency measures), then IT is not abnormal; if OccurrenceFactor is in between MFreqM [Min] (minimum value based on frequency measures) and MFreqM[Max] (maximum value based on frequency measures), and MOccurrenceFactor is >=0.8, then IT is not abnormal. If IT is abnormal (488) based on IT abnormality factor, raise an abnormal trans alert and send alert signal to peer DEBBs (490).

FIG. 5 provides a brief description of Error Monitoring and Analysis. Errors generated within a data center are localized with respect to that data center, and hence are processed completely within the associated DEBB. On obtaining of a data center error information EI (500), log the time stamped error information (510). Obtain the error type ET based on EI, apply policies based on ET, EI, and determine Err-Policy-Abnormality (520). Note that as DEBBs are enterprise specific, the policies enforced by a DEBB are enterprise specific as well. Determine Err-Model-Abnormality based on EI and a set of models. An illustrative model is defined based on ET, EI, time of error, day of error, and parameters of error associated with a set of errors. Determine Err-Abnormality-Risk for the error based on prior error alerts associated with the error. Finally, compute Err-Abnormality based on above mentioned three abnormalities, namely, Err-Policy-Abnormality, Err-Model-Abnormality, and Err-Abnormality-Risk. Determine whether the error is abnormal based on the computed Err-Abnormality (530). If so, raise an abnormal error alert and send this alert signal to other DEBBs (540).

FIG. 6 provides a brief description Exception Monitoring and Analysis. Exceptions generated within a data center are localized with respect to that data center, and hence are processed completely within the associated DEBB. On obtaining of a data center exception information EXI (600), log the time stamped exception information (610). Obtain the exception type EXT based on EXI, apply policies based on EXT and EXI, and determine Ex-Policy-Abnormality (620). Note that as DEBBs are enterprise specific, the policies enforced by a DEBB are enterprise specific as well. Determine Ex-Model-Abnormality based on EXI and a set of models. An illustrative model is defined based on EXT, EXI, time of exception, day of exception, and parameters of exception associated with a set of exceptions. Determine Ex-Abnormality-Risk for the exception based on prior exception alerts associated with the exception. Finally, compute Ex-Abnormality based on above mentioned three abnormalities, namely, Ex-Policy-Abnormality, Ex-Model-Abnormality, and Ex-Abnormality-Risk. Determine whether the exception is abnormal based on the computed Ex-Abnormality (630). If so, raise an abnormal exception alert and send this alert signal to other DEBBs (640).

FIG. 7 provides a brief description of the Archiving process. On receiving the archiving request (700), determine whether the request is for local archiving or remote archiving. Based on the request and open the appropriate archive connection (710). Through the open connection, archive the stored login information, transaction information, data center (DC) error information, data center (DC) exception information, and alerts information (720). On completion of the archiving process, the close the archive connection (730).

FIG. 8 provides a brief description of Status Monitoring. On receiving of DEBB status request (800), obtain the cumulative statistics related to login, transaction, error, exception, and alerts information (810). Obtain information related to current status: Number of logins, Number of transactions under processing, Number of errors under analysis, Number of exceptions under analysis, and number of alerts being raised (820). Obtain the information related to archives: date of last archive, and amount of information to be archived (830). And, send the obtained status information (840).

FIG. 9 provides a brief description of Configuration Management. On receiving of request for configuring of DEBB (900), obtain config information related to Policies, Archiving intervals, Login analysis thresholds, Transaction analysis thresholds, Error analysis thresholds, Exception analysis thresholds, and Alerts analysis thresholds (910). Update Config information within DEBB (920).

FIG. 10 provides a brief description of Peer Coordination among a plurality of DEBBs. In the next generation data center scenario, the application and data assets of an enterprise are distributed across multiple data centers. The multiple DEBBs associated with these multiple data centers form an overlay network in order to provide a comprehensive and collective awareness, assuredness, and auditability. One of the ways to exploit the DEBB overlay network is to achieve distributed processing: each of the DEBBs is assigned a distinct data space to operate. Peer coordination helps in (a) ensuring that load is distributed; (b) reducing the unnecessary loading of the overlay network; and (c) efficient processing for alert generation.

Identify the target DEBB based on user ID; Login data is partitioned on users based on the number of deployed DEBBs and each DEBB is assigned a unique set of users for analysis (1000). On receiving of a login request, identify the appropriate DEBB based on the associated user set (1010). Peer coordination helps in the processing of the login request in a distributed manner. On receiving of an alert related to a login abnormality, obtain the corresponding user, and perform alert based processing to determine the login risk (1020). Such an alert processing is helpful in effectively accounting for the prior alerts. Identify the target DEBB based on Transaction Type; Transaction types are partitioned on type based on number of deployed DEBBs and each DEBB is assigned a unique set of transaction types for analysis (1030). On receiving of a transaction, identify the appropriate DEBB based on the associated transaction type set (1040). On receiving of an alert related to a transaction abnormality, obtain the corresponding transaction type, and perform alert based processing to determine the transaction risk (1050). On receiving of an alert related to a data center (DC) Error or a DC Exception abnormality, obtain the corresponding error or exception type, and perform alert based processing to determine the DC Error/DC Exception risk (1060).

FIG. 11 provides a brief description of the Alert based Risk Assessment. An alert is generated by a DEBB on observing of an abnormal activity such as an abnormal login request, a abnormal transaction request, an abnormal data center error, or an abnormal data center exception. In order to process these alerts in a comprehensive manner, it is required to gather the alerts from the various DEBBs. Such a gathered sequence of alerts help in the analysis of an activity based on the prior alerts related to similar past activities. As analysis is distributed across multiple DEBBs, it is required to send the information related to a raised alert signal to other peer DEBBs as well. Obtain alert related information: User ID, Transaction Type, Transaction ID, DC Error ID, and DC Exception ID (1100). Update the alert database (1105). Note that a completely updated alert database is available in each DEBB.

Obtain a login ID request (1110). Obtain a sequence of abnormal login alerts for the corresponding user based on login analysis (1115). Predict the alert score based on, say, time series analysis of the alert sequence (1120). Compute Login-Abnormality-Risk based on the predicted alert score (1125). Obtain a Transaction Type (TT) of a Transaction T (1130). Obtain a sequence of abnormal transaction alerts for the Transaction Type TT (1135). Predict the alert score based on, say, time series analysis of the alert sequence (1140). Compute Trans-Abnormality-Risk based on the predicted alert score (1145). Obtain a DC Error Type ET of a DC error (1150). Obtain a sequence of abnormal error alerts for the Error Type ET (1155). Predict the alert score based on, say, time series analysis of the alert sequence (1160). Compute Err-Abnormality-Risk based on the predicted alert score (1165). Obtain a DC Exception Type (EXT) of a DC exception (1170). Obtain a sequence of abnormal exception alerts for the Exception Type EXT (1175). Predict the alert score based on, say, time series analysis of the alert sequence (1180). Compute Ex-Abnormality-Risk based on the predicted alert score (1180).

FIG. 12 provides a brief description of an approach for the generation of External and Internal Transaction models. Typically, an external transaction of a certain type leads to the invocation of a known sequence of internal transactions. Here, the notion of internal transaction means that a transaction such as a db transaction initiated by a data center while processing of an external transaction or an internal transaction. Another example of an internal transaction is the sending of a transaction request to another data center while processing of an external transaction or an internal transaction. The objective is to identify the well known sequences of internal transactions related to an external transaction and these identified well known sequences are called as model sequences. Such model sequences are used to detect an abnormal external transaction based on whether the generated sequence of internal transactions is as per one of the models sequences or not. Note that the models are based on the external transaction types.

Obtain an External Transaction type (XTT) (1200). Obtain a set of external transactions, SXT, of type XTT; Obtain a sequence of internal transactions for an external transaction in SXT and obtain the corresponding sequence of Internal Transaction types (SITT) (1205). Correlate the multiple SITTs associated with the multiple transactions in SXT (1210). Compute the multiple model sequences, MSITTs, based on the sequence correlation (1215).

Obtain an internal transaction type (ITT) (1250). Obtain a set of transactions (SXT) related to an external transaction (XT) (1255). Identify a subset (SSXT) of SXT such that in each XT of SSXT an internal transaction of type ITT happens (1260). In each XT of SSXT, identify the number of times a transaction of type ITT occurred; Determine the model frequency measure, MFreqMeasure, based on the above sequence of numbers (1265). Note that this measure is related to an internal transaction type and an external transaction type. An illustrative MFreqMeasure computation could involve (i) MFreqM[Min]–minimum value of the sequence of numbers, (ii) MFreqM[Max]–maximum value of the sequence of numbers, and (iii) MFreqM(Av)–the average of the sequence of numbers. Compute MOccurrenceFactor based on SXT and SSXT (1270). This factor is also related to an internal transaction type and an external transaction type, and is a measure of how consistently an internal transaction of the internal transaction type happens as part of an external transaction of the external transaction type. A way to compute this measure is as follows: let N be the number of external transactions in SXT and let N1 be the number of external transactions in SSXT; and compute MOccurrenceFactor as N1/N.

Thus, a system and method for enterprise specific black box for data centers is disclosed. Although the present invention has been described particularly with reference to figures, it will be apparent to one of the ordinary skill in the art that the present invention may appear in any number of systems that need to provide a comprehensive awareness, assuredness, and auditability to enterprises. It is further contemplated that many changes and modifications may be made by one of ordinary skill in the art without departing from the spirit and scope of the present invention.

What is claimed is:

1. A distributed black box system, comprising a plurality of data center enterprise black box (DEBB) systems, for providing comprehensive awareness, assuredness, and auditability of a plurality of activities with respect to a plurality of data centers to an enterprise by raising a plurality of alerts based on a plurality of model sequences, a plurality of model frequency measures, and a plurality of model occurrence factors, wherein a plurality of application and data assets of said enterprise are hosted by said plurality of data centers in a distributed manner, a DEBB system part of said distributed black box system is associated with a data center of said plurality of data centers, and said DEBB system provides a black box functionality for said enterprise by providing a single point of entry and exit for requests directed to said data center and by coordinating with a plurality of peer DEBB systems, wherein each of said peer DEBB systems is a part of said plurality of DEBB systems, said plurality of activities result in a plurality of transactions with respect to said plurality of data centers, said plurality of transactions result in a plurality of errors related to said plurality of data centers, said plurality of transactions result in a plurality of exceptions related to said plurality of data centers, said DEBB system including a non-transitory tangible computer readable medium storing computer readable program code for causing a computer to perform the steps of:

determining an external transaction, wherein said external transaction is a transaction initiated by said enterprise and is a part of said plurality of transactions;

determining an external transaction type of said external transaction;

determining a sequence of internal transactions related to said external transaction, wherein each internal transaction of said sequence of internal transactions is initiated by a data center of said plurality of data centers;
  determining a sequence of internal transaction types, wherein each internal transaction type of said sequence of internal transaction types corresponds with an internal transaction of said sequence of internal transactions;
  determining a plurality of external transactions, wherein each of said plurality of external transactions is of said external transaction type;
  determining a plurality of sequences of internal transaction types, wherein each sequence of said plurality of sequences of internal transaction types is associated with an external transaction of said plurality of external transactions; and
  correlating of said plurality of sequences of internal transaction types to compute a plurality of computed model sequences, wherein each of said plurality of computed model sequences is a part of said plurality of model sequences.

2. The system of claim 1, wherein said computer readable program code further comprises code for causing the computer to perform the steps of:
  determining an external transaction of said plurality of transactions, wherein said external transaction is a transaction initiated by said enterprise and is a part of said plurality of transactions;
  determining an external transaction type of said external transaction;
  determining a sequence of internal transactions related to said external transaction, wherein each internal transaction of said sequence of internal transactions is initiated by a data center of plurality of data centers and is a part of said plurality of transactions;
  determining a sequence of internal transaction types, wherein each internal transaction type of said sequence of internal transaction types corresponds with an internal transaction of said sequence of internal transactions;
  determining a plurality of internal transaction type model sequences based on said external transaction type and said plurality of model sequences;
  correlating of said sequence of internal transaction types with each of said plurality of internal transaction type model sequences to determine an abnormality factor of said external transaction; and
  raising of an abnormal transaction alert of said plurality of alerts based on said abnormality factor.

3. The system of claim 1 wherein said computer readable program code further comprises code for causing the computer to perform the steps of:
  determining an internal transaction of said plurality of transactions, wherein said internal transaction is a transaction initiated by a data center of said plurality of data centers;
  determining an internal transaction type of said internal transaction;
  determining an external transaction of said plurality of transactions associated with said internal transaction;
  determining an external transaction type of said external transaction;
  determining an occurrence count associated with said internal transaction type and said external transaction, wherein said occurrence count is based on the number of times an internal transaction of said internal transaction type happens as part of said external transaction;
  determining a model frequency measure and a model occurrence factor based on said internal transaction type, said external transaction type, said plurality of model frequency measures, and said plurality of model occurrence factors;
  determining an abnormality factor based on said occurrence count, said model frequency measure, and said model occurrence factor;
  raising of an abnormal transaction alert of said plurality of alerts based on said abnormality factor.

4. The system of claim 1, wherein said computer readable program code further comprises code for causing the computer to perform the steps of:
  determining a transaction of said plurality of transactions;
  determining a transaction type of said transaction;
  determining a sequence of abnormal transaction alerts associated with said transaction type, wherein an alert of said sequence of abnormal transaction alters is a part of said plurality of alerts;
  predicting an alert score based on a time series analysis of said sequence of abnormal transaction alerts;
  computing a transaction abnormality risk based on said alert score; and
  raising of an abnormal transaction alert of said plurality of alerts based on said transaction abnormality risk.

5. The system of claim 1, wherein said computer readable program code further comprises code for causing the computer to perform the steps of:
  determining an error of said plurality of errors;
  determining an error type of said error;
  determining a sequence of abnormal error alerts associated with said error type wherein an alert of said sequence of abnormal error alters is a part of said plurality of alerts;
  predicting an alert score based on a time series analysis of said sequence of abnormal error alerts;
  computing an error abnormality risk based on said alert score; and
  raising of an abnormal error alert of said plurality of alerts based on said error abnormality risk.

6. The system of claim 1, wherein said computer readable program code further comprises code for causing the computer to perform the steps of:
  determining an exception of said plurality of errors;
  determining an exception type of said error;
  determining a sequence of abnormal exception alerts associated with said exception type wherein an alert of said sequence of abnormal exception alters is a part of said plurality of alerts;
  predicting an alert score based on a time series analysis of said sequence of abnormal exception alerts;
  computing an exception abnormality risk based on said alert score; and
  raising of an abnormal exception alert of said plurality of alerts based on said error abnormality risk.

7. The system of claim 1, wherein said further computer readable program code further comprises code for causing the computer to perform the steps of:
  determining an internal transaction, wherein said internal transaction is a transaction initiated by a data center of said plurality of data centers and is a part of said plurality of transactions;
  determining an internal transaction type of said internal transaction;

determining an external transaction type;

determining a plurality of external transactions of said plurality of transactions related to said external transaction type;

identifying a plurality of associated external transactions, wherein each of said plurality of associated external transactions is a part of said plurality of external transactions and an internal transaction of said internal transaction type happens as part of each associated external transaction of said plurality of associated external transactions;

determining a sequence of numbers, wherein each number of said sequence of numbers corresponds with the count of number times an internal transaction of said internal transaction type happens as part of an associated external transaction of said plurality of associated external transactions;

determining a model frequency measure of said plurality of model frequency measures based on said sequence of numbers; and determining a model occurrence factor of said plurality of model occurrence factors based on said plurality of associated external transactions and said plurality of external transactions.

* * * * *